United States Patent [19]
Stenild

[11] Patent Number: 5,456,585
[45] Date of Patent: Oct. 10, 1995

[54] POSITIVE DISPLACEMENT FLUID MOTOR WITH FLEXIBLE BLADES

[76] Inventor: Eddie L. Stenild, Fuglebaekvej 2, DK-2770 Kastrup, Denmark

[21] Appl. No.: 244,447

[22] PCT Filed: Dec. 2, 1992

[86] PCT No.: PCT/DK92/00363

§ 371 Date: Aug. 2, 1994

§ 102(e) Date: Aug. 2, 1994

[87] PCT Pub. No.: WO93/11408

PCT Pub. Date: Jun. 10, 1993

[30] Foreign Application Priority Data

Dec. 2, 1991 [DK] Denmark ................................. 1948/91

[51] Int. Cl.$^6$ ........................................................ F03C 2/30
[52] U.S. Cl. ........................................ 418/154; 418/156
[58] Field of Search ........................... 418/153, 154, 418/155, 156, 260

[56] References Cited

U.S. PATENT DOCUMENTS

| | | |
|---|---|---|
| 2,636,478 | 4/1953 | Smyser . |
| 2,636,479 | 4/1953 | Smyser . |
| 2,753,809 | 7/1956 | Garrison . |
| 2,882,868 | 4/1959 | Smyser ................................. 418/153 |
| 3,054,355 | 9/1962 | Neely ................................... 418/154 |
| 3,169,841 | 2/1965 | Weis ..................................... 418/153 |
| 3,510,229 | 5/1970 | Smith .................................... 418/154 |

FOREIGN PATENT DOCUMENTS

| | | |
|---|---|---|
| 1213695 | 4/1960 | France . |
| 1076495 | 2/1960 | Germany . |
| 3108507 | 9/1982 | Germany ............................. 418/154 |

*Primary Examiner*—Richard A. Bertsch
*Assistant Examiner*—Charles G. Freay
*Attorney, Agent, or Firm*—Ladas & Parry

[57] ABSTRACT

The fluid motor, e.g. a liquid meter, a mixing apparatus or a turbine, has a chamber (1) with a rotor having stiff blades (7) which at their outer ends are provided with plate formed wings (8) of elastomeric material. The wings (8) are by a thin, overlapping part fastened to the reverse side of the blades (7) in relation to the rotating direction. When passing between outlet (5) and inlet (4) of the chamber (1) the wings (8) are deflected by a wall part in the chamber. The rotor is smooth-running, noise-free and inexpensive to produce and repair in connection with abrasion of the wings.

4 Claims, 1 Drawing Sheet

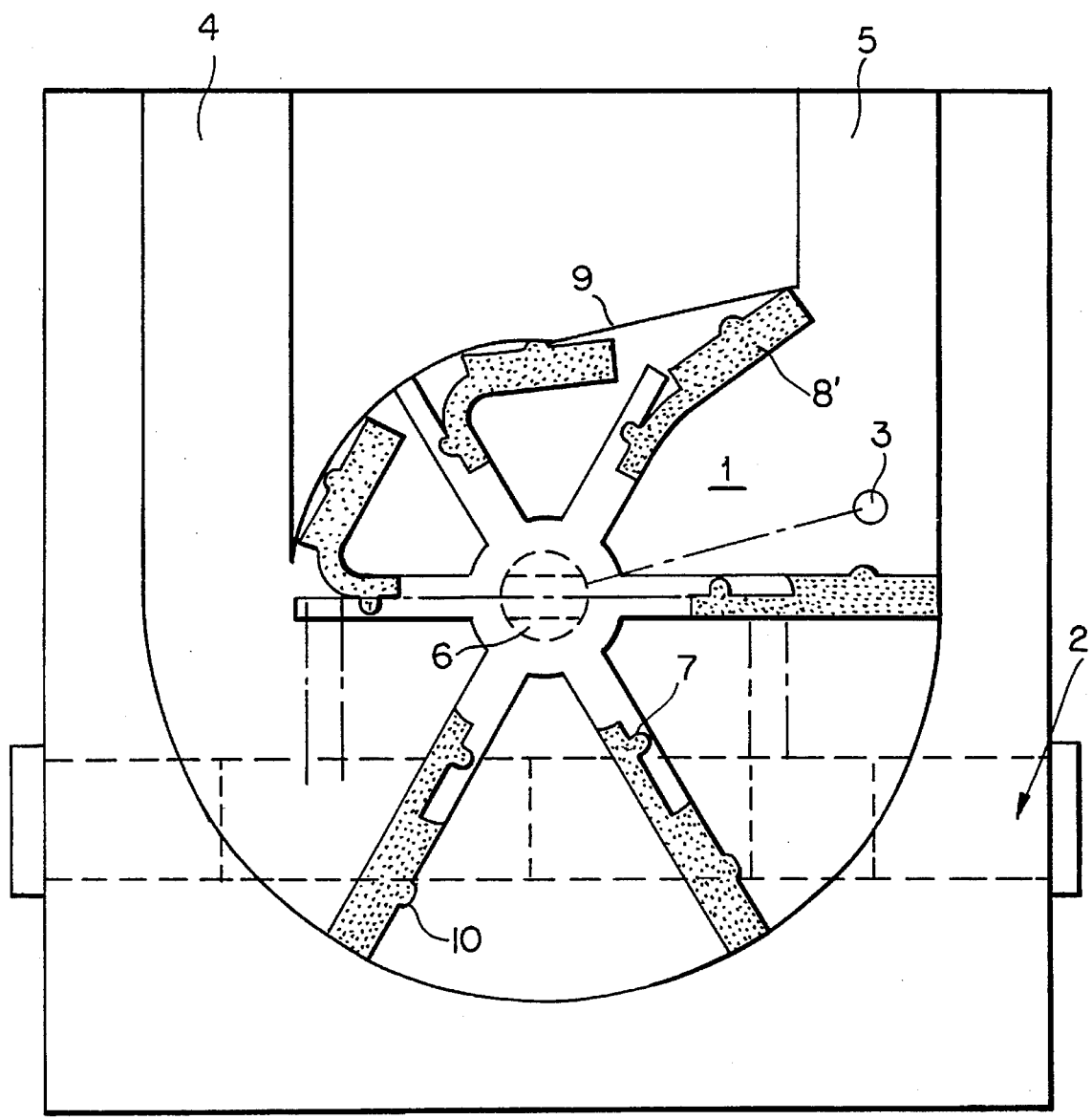

5,456,585

POSITIVE DISPLACEMENT FLUID MOTOR WITH FLEXIBLE BLADES

TECHNICAL FIELD

The present invention relates to a fluid motor having a shaft which is operated by means of a flowing fluid, e.g. for measuring of fluid, and having a rotor mounted in a housing having a number of blades mounted regularly around the bearing shaft, each blade composed by a stiff blade of metal and a flexible, elastomeric part.

BACKGROUND ART

For volume measurement of flowing fluid it is known to use a rotor with blades mounted in a housing, which blades are pivotally connected with a rotor body and which are forcibly guided in such a way that over one part of the cylindrical wall of the housing they are turned towards this to form a barrier between the inlet and outlet port, and over another part of the cylindrical wall of the housing having a smaller diameter than the former they are deflected backwards relative to the rotating direction to form a sealing between this part of the cylindrical wall and the rotor. The known devices of this kind, e.g. water meters, are relatively expensive to produce and repair, the blades being difficult to exchange piece by piece, for which reason it is often necessary to exchange the whole rotor. In many cases the rotor provides an undesired, great resistance against rotation, too. Yet another drawback of some of the known liquid meters is that the pivotally connected blades have a tendency to stick when the device has not been used for a longer period of time, and that they are noise generating.

However, from U.S. Pat. No. 2,753,809 a motor or pump is known, the rotor of which is provided with blades where a metal plate is mounted along the flexible elastomeric blade part to reinforce this part which is constituted by an extending tab on an elastomeric base embedded in a groove in the rotor. By this construction a relatively great amount of elastomeric material for each blade is involved, and in connection with abrasion of the material it is necessary to renew the whole blade.

Besides, from U.S. Pat. Nos. 2,636,478 and 2,636,479 liquid meters are known where wings of flexible material are extending practically from the center of the hub to the circumference and which are supported by intricately constructed metal parts. Also by this construction it is difficult to exchange worn parts piece by piece, and furthermore, the wings, which slide against the wall of the housing, involve a relatively great resistance against the movement of the rotor in the housing.

DISCLOSURE OF THE INVENTION

It is the object of the present invention to provide a fluid motor of the kind referred to initially having a rotor, the production of which is connected with low costs, is smooth-running, noise-free and inexpensive to repair because the worn parts are easily exchangeable. A rotor having these properties is not only desired in any volume meter which is to operate with a great accuracy, e.g. in order to secure an exact blending ratio in a dosage apparatus, but also in an apparatus where the rotor has to function as a driving or turbine wheel.

The fluid motor according to the present invention is characterized in that the elastomeric parts of the blades are plate-formed wings mounted at the radially outer ends of the stiff blades, each wing with a thin, flexible part fixed to and overlapping the outer end of the blade on the side thereof facing backwards relative to the rotating direction, whereas the part of the wing lying radially outside the stiff blade has a greater plate thickness and at the interface to the flexible part overlaps the edge of the blade.

A rotor like that is smooth-running, and without generating serious resistance the wings are able to move tightly closing along a wall in the housing concentric to the rotor shaft and can also without serious resistance be folded and tightly closing follow the wall of the housing placed closer to the shaft and form a barrier between the inlet and outlet of the housing. Where the housing of the rotor functions as a mixing chamber, to which a dosed admixture is introduced, it is besides an advantage that the wings generate a certain movement in the fluids in the chamber.

It has been found that the wings provide sufficient tightness at the circumference wall of the mixing chamber, deflect slightly in reverse direction and in spite hereof are sufficiently stiff against pressure influence on their reverse side, so that they provide a well running, exactly functioning measuring wheel, which e.g. operates securely in connection with water supply at common supply pressure and at small volume amounts and even at suction of the medium through the apparatus. The flexible wings generate tightness even with a very small system pressure, and it is possible to mount them easily exchangeable in undercut grooves in the blades. Reduced abrasion on the wings and securing a certain distance between the major part of their surface and the sluice chamber can be achieved by providing the wings with an extending bead on their front side in the rotating direction. Moreover, the flexible wings secure that the liquid flow can pass even if the rotor should be blocked by accident, because in that case some of the wings would bend backwards and act as safety control. If necessary, a reinforcement, e.g. a wire net, can be embedded in the elastomeric material in the wings.

BRIEF DESCRIPTION OF THE DRAWINGS

In the following detailed portion of the specification, the present invention will be explained in more detail with reference to the drawings which schematically show an embodiment of the fluid motor according to the invention.

DESCRIPTION OF THE PREFERRED EMBODIMENTS

In the shown embodiment for the fluid motor according to the invention a mixing chamber 1 is shown, with a top cover above the housing of the apparatus removed. Besides, by dotted lines a feeder 2 is indicated, which via valve means at the rotor shaft (not shown) can be connected with the mixing chamber through an intake port 3. The mixing chamber 1 functions as a volume meter for a main flow of fluid which is passed in through an inlet 4 and away through an outlet 5. The flowing amount of fluid is measured by counting and recording the rotations of a shaft 6 of a rotor having stiff blades 7 of metal or plastic and plate-formed wings 8 of elastomeric material fixed at the ends of these blades. During their movement through a displacement part of the chamber the wings 8 slide against a cylindrical wall with their outer ends, and in a sluice part 9 they are deflected by an external wall part. It is shown that the wings 8 with a thin part overlap a corresponding, thin part at the end of each blade 7, and they are fixed to the side of the blades facing backwards relative to the rotating direction. It has been found that by this construction a wing wheel is achieved which is sufficiently smooth-running and tightly closing to function as an exact measuring instrument for fluids flowing with low pressure, e.g. fuel oil or water with a common supply pressure. The wings 8 can preferably be fastened with beads extending in axial direction from the thin, plate-formed parts and embedded in the undercut grooves on the backside of the metal wings 7 so that they become easily exchangeable. Further, each of the flexible wings 8 has preferably a bead 10 running in axial direction which reduces the contact surface between the wing and the wall in the sluice part 9. A reinforcement may optionally be embedded in the wings 8.

The fluid motor with the described rotor can also be used as a simple flow meter or optionally as a water turbine. The rotor might e.g. be used as driving wheel in a lawn sprinkler.

I claim:

1. A fluid motor having a shaft which is operated by means of a flowing fluid and having a rotor enclosed in a housing for rotation in a rotating direction said rotor having a plurality of blades, each blade comprising a stiff blade and a flexible elastomeric part, each stiff blade having an outer end and an inner end, said inner end being connected to said rotor, said elastomeric part being positioned on said outer end of the stiff blade, each elastomeric part having a thin, flexible section and a thicker section, said thin, flexible section fastened to and overlapping with the outer end of the stiff blade on a side of the stiff blade facing backwards in the rotating direction, and in a non-deformed position the thicker section of the elastomeric part of the blade lies in a continuous extension of the stiff blade by means of the thin section of the elastomeric part of the blade.

2. A fluid motor according to claim 1, wherein the thin flexible section of the elastomeric part of the blade that overlaps the stiff blade has a undercut rib running in an axial direction of the rotor, which rib is embedded in a corresponding undercut groove in the stiff blade.

3. A fluid motor according to claim 1, wherein the thicker section of the elastomeric part of the blade extending radially, from the stiff blade has a protrusion on its side facing forwards relative to the rotating direction.

4. A fluid motor according to claim 1, wherein the elastomeric part of the blade is reinforced by embedding fibers in the elastomeric part.

* * * * *